United States Patent [19]

Kimura et al.

[11] 4,267,792

[45] May 19, 1981

[54] ELASTICALLY DEFORMABLE FENDER

[75] Inventors: Tamisuke Kimura, Kobe; Tomokazu Kashiwara; Tetsuo Yamaguchi, both of Nishinomiya, all of Japan

[73] Assignee: Sumitomo Rubber Industries, Ltd., Kobe, Japan

[21] Appl. No.: 973,035

[22] Filed: Dec. 26, 1978

[30] Foreign Application Priority Data

Dec. 27, 1977 [JP] Japan .................. 52-159597

[51] Int. Cl.³ .......................................... B63B 59/02
[52] U.S. Cl. .................................. 114/219; 267/140; 267/153; 405/215
[58] Field of Search ............... 114/219; 405/212, 215; 267/153, 140; 293/136

[56] References Cited

U.S. PATENT DOCUMENTS

| | | | |
|---|---|---|---|
| 2,027,800 | 1/1936 | Whitlock | 267/140 X |
| 3,019,758 | 2/1962 | Erkert | 114/219 |

FOREIGN PATENT DOCUMENTS

| | | | |
|---|---|---|---|
| 2461687 | 7/1975 | Fed. Rep. of Germany | 114/219 |
| 2524886 | 5/1976 | Fed. Rep. of Germany | 114/219 |
| 10741 | 12/1955 | German Democratic Rep. | 405/215 |
| 1197534 | 7/1970 | United Kingdom | 114/219 |

*Primary Examiner*—Sherman D. Basinger
*Attorney, Agent, or Firm*—Birch, Stewart, Kolasch & Birch

[57] ABSTRACT

An elastically deformable fender adapted to be mounted on one or both of the hull of a ship and a shore installation such as pier, wharf, quay, dock, float or the like structure for cushioning the impact of the ship against the shore installation, which generally comprises an elongated body of one-piece construction made of an elastic material. The body includes a buffer block, an outer surface of which forms an impact receiving surface, and a pair of opposed support walls depending from the buffer block so as to diverge from each other in a direction away from the buffer block. Each of the support walls is bent widthwise and is constituted by leg and heel sections respectively positioned adjacent to and remote from the buffer block, the heel sections of the respective support walls being spaced from each other a maximum span within the range of $(0.75 \times W)$ to $(1.5 \times W)$, W representing the width of the buffer block.

3 Claims, 7 Drawing Figures

ELASTICALLY DEFORMABLE FENDER

BACKGROUND OF THE INVENTION

The present invention relates to an elastic fender adapted to be mounted on the hull of a ship and a shore installation such as pier, wharf, quay, dock, float or like structure for cushioning the impact of a ship against a shore installation.

Various types of elastic fenders have long been used to cushion the impact of a ship against a shore installation for protecting both the side of the hull of the ship and the shore installation. Elastic fenders generally considered feasible for this purpose are of a type capable of exhibiting such a performance curve as to follow the following stages in sequence during elastic deformation of such fender.

(I) Initial Set-up Stage: During this stage, the rate of increase of the reaction force of the fender incident to compression of such fender which takes place as the hull of the ship contacts the fender is greater than the rate of increase of the amount of deformation of such a fender by the action of such compression.

(II) Set-back Stage: This set-back stage occurs subsequent to the initial set-up stage and, during this stage, the rate of increase of the reaction force of the fender being compressed is retarded to a value smaller than the rate of increase of the amount of deformation of such fender due to the fact that the fender is flexed or buckled.

(III) Final Set-up Stage: The rate of increase of the reaction force of the fender again becomes greater than the rate of increase of the amount of deformation of such fender due to the fact that the fender is further compressed in contact with the hull of the ship.

The performance of the elastic fender is evaluated in consideration of the amount of deformation of the fender, which occurs subsequent to the application of an impact from the ship to such fender, and the magnitude of energy absorbed by such fender, that is, the energy absorbability, which is, in a graph showing the above described performance curve, represented by the surface area of such a region as defined by the performance curve, one of the axes of coordinates representing the amount of deformation and a line drawn from the point of start of the final set-up stage on the performance curve and intersecting at right angles to such one of the axes of coordinates. Specifically, the elastic fender is considered excellent in performance if the deformability of the fender is high while exhibiting a large surface area of the above described region.

Some types of elastic fenders which exhibit the above described performance curve are disclosed in, for example, the British Patent Specification No. 945,456, published on Jan. 2, 1964; the U.S. Pat. Nos. 3,418,815 and 3,418,816, both patented on Dec. 31, 1968; and the U.S. Pat. No. 3,820,495, patented on June 28, 1974.

The above mentioned British Patent Specification discloses an elastic fender of a construction comprising a hollow rubber tube of trapezium-shaped cross section with a fitting surface, a buffer surface opposite the fitting surface and a pair of supporting walls between the fitting and buffer surfaces, the section of the tube in a plane at right angles to the longitudinal axis of the tube having the approximate form of an isosceles trapezium with its top forming said buffer surface, the bottom forming said fitting surface and the two lateral sides of equal length forming said supporting walls. This British Patent Specification further discloses that the fender of the above described construction can attain a maximum performance if the trapezium forming the cross sectional shape of the hollow rubber tube satisfies the following requirements:

$$A = H \text{ to } 3H, \ B = 0.2H \text{ to } 0.8H, \ t = 0.15H \text{ to } 0.4H, \text{ and}$$
$$\theta = 45° \text{ to } 80°$$

wherein H is the height as measured between the top and the bottom, A is the bottom width, B is the top width, t is the wall thickness of each of the supporting walls, and $\theta$ is the angle of each of the lateral sides relative to the bottom.

The U.S. Pat. No. 3,418,815 discloses a fender of a construction comprising a hollow elastic tube similar to that disclosed in the above mentioned British Patent Specification, but has a rigid plate embedded in the buffer surface portion for optimum load-distribution both on the side of the ship and throughout the elastic material to produce improved energy-absorbing characteristics. The use of an additional rigid plate embedded in the fitting surface portion of the hollow elastic tube is also disclosed therein.

The U.S. Pat. No. 3,418,816 discloses a fender assembly constituted by a plurality of fenders each being substantially identical with that disclosed in the above mentioned U.S. Pat. No. 3,418,815.

Furthermore, an elastic fender of a construction having a substantially V-shaped cross section is well known and is shown in FIG. 1 of the accompanying drawings in a cross sectional view. Referring now to FIG. 1, this known V-shaped fender comprises a pair of elongated supporting walls 1 and 2 of equal width connected integrally at one side edge with each other by a bridge wall 3, said bridge wall 3 having a flat buffer surface 4 facing in a direction remote from fitting flanges 5 and 6 which extend respectively from the other side edges of the associated supporting walls 1 and 2 in a direction away from each other and in parallel relation to the plane of the buffer surface 4. This fender is of one-piece construction made of an elastic material such as rubber.

In the construction described above, when a compressive force is applied from, for example, the hull of a ship to the flat buffer surface 4 in a direction perpendicular to the plane of the buffer surface 4 while the fender is mounted on the shore installation with the flanges 5 and 6 rigidly secured thereto by means of, for example, set bolts, the V-shaped fender undergoes elastic deformation in such a manner that the opposed portions of the fender where the supporting walls 1 and 2 are integrally connected to the bridge wall 4 expand outwardly with respect to each other with a substantially intermediate portion of the bridge wall 3 tending to outwardly protrude into a space between the supporting walls 1 and 2, substantially as shown by the single chain line X, and when that portions of the fender where the supporting walls 1 and 2 are intergrally connected to the bridge wall 3 are subsequently brought to respective positions outwardly of associated lines Z, each drawn at right angles to the plane of the fitting surface of the corresponding fitting flange 5 or 6 and passing through the fulcrum Q about which the corresponding supporting wall 1 or 2 can freely pivot during the deformation of the fender, substantially as shown by the double chain line Y, the supporting walls 1 and 2 are buckled outwardly with respect to each other with a relatively large amount of reaction forces consequently generated against the hull of the ship. The performance curve of this fender shown in FIG. 1 is shown by (A) in a graph of FIG. 2 of the accompanying drawings.

In the construction shown in FIG. 1, if the outward expansion of that portions of the fender where the supporting walls 1 and 2 are integrally connected to the bridge wall 3 and the protrusion of the substantially intermediate portion of the bridge wall 3 can be restrained for a substantial period of time as long as possible, the time at which the buckling occurs in the supporting walls 1 and 2 in the manner described above can be delayed for a corresponding period of time, which in turn results in improvement of the energy absorbability of the fender.

In addition, in the construction shown in FIG. 1, immediately after the supporting walls 1 and 2 have started their buckling, they continuously contact the hull of the ship with the area of contact of each supporting wall 1 or 2 to the hull of the ship increased and, therefore, the area of the fender on which a load is imposed by the ship gradually increases. When this load acting area of the fender increases to such an extent as to spread outwardly of the imaginary lines Z which extend at right angles to the fitting flanges 5 and 6 and pass through the associated fulcrums Q about which the respective supporting walls 1 and 2 can pivot during the deformation or elastic collapse of the fender occurring in the manner described above, the supporting walls 1 and 2 become completely buckled outwardly with respect to each other while the direction in which the load acts on the fender becomes parallel to any one of the imaginary lines Z passing through the respective fulcrums Q. This is the start of the final set-up stage (III) referred to hereinbefore and the reaction force generated by the fender so deformed or collapsed accordingly increases rapidly. Therefore, if the contact of the supporting walls 1 and 2 to the hull of the ship during the buckling of the supporting walls 1 and 2 is shirked while the load of the ship is made to act on the fender in a direction diagonally with respect to the imaginary lines Z, the possibility of the buckling of the supporting walls 1 and 2 can be retained for a substantially prolonged period of time, which in turn results in improvement of the energy absorbability of the fender.

The fender disclosed in the U.S. Pat. No. 3,820,495 is considered an improved version of the fender of the construction shown in FIG. 1 in terms of the energy absorbability and is similar in construction to that shown in FIG. 1 except for a fluted groove and a fluted rib which are provided in the bridge wall of the fender of the last mentioned U.S. Patent. In addition, the latter also discloses the use of rigid reinforcement plates each embedded in the corresponding fitting flange.

According to the last mentioned U.S. Patent, the fluted rib extending lengthwise of the fender and protruding into a space between the supporting walls from the inside surface of the bridge wall opposite to the buffer surface is so designed that, when the fender is extensively collapsed with the supporting walls outwardly buckled with respect to each other, said rib can abut on the shore installation to support the bridge wall together with the buckled supporting walls for absorbing further shock energy. On the other hand, the fluted groove extending lengthwise of the fender and defined in the buffer surface of the bridge wall opposite to the fluted rib, thereby dividing the buffer surface into buffer areas one on each side of the fluted groove, is so designed that, as the fender is elastically collapsed, the buffer areas on respective sides of the fluted groove move in a direction close towards each other, while slip takes place between the hull of the ship and each buffer area, thereby avoiding the possible outward expansion of that portions of the fender where the supporting walls are integrally connected to the bridge wall, such as occurring in the construction shown in FIG. 1, and hence delaying the time at which each of the supporting walls starts its buckling movement.

The fender of the construction disclosed in the last mentioned U.S. Patent can, in fact, exhibit an improved energy absorbability in view of the fact that the time at which each of the supporting walls starts its buckling movement can be delayed by the provision of the fluted groove. However, in practice, since the coefficient of friction between the buffer areas of the fender and the hull is not always fixed and varies depending on the type of ships and/or the surface condition of the buffer areas, the movement of the buffer area on respective sides of the fluted groove in a direction close towards each other which takes place as the fender is collapsed by the application of a load thereto from the ship is not always stable and is likely to be facilitated where such frictional coefficient is low while to be retarded where it is high. By way of example, though the fender disclosed in the last mentioned U.S. Patent generally have such a performance curve as shown by (B) in the graph of FIG. 2, this fender would give such a performance curve as shown by (C) in the graph of FIG. 2 where the friction drag is large and would give a performance curve approximating to the performance curve (A) where the friction drag is small. In other words, the fender of the construction disclosed in the last mentioned U.S. Patent involves such a disadvantage that not only does the performance tend to vary depending upon the friction drag developed between the buffer areas of the fender and the hull of the ship, but also the energy absorbability is still relatively low.

SUMMARY OF THE INVENTION

Accordingly, the present invention has for its essential object to provide an improved elastically deformable fender of substantially Y-shaped cross section, which can exhibit an improved energy absorbability as compared with that of any one of the prior art fenders hereinbefore discussed.

Another important object of the present invention is to provide an improved elastically deformable fender of the type referred to above which can satisfactorily and effectively cushion the impact applied thereto from any direction.

A further object of the present invention is to provide an improved elastically deformable fender of the type referred to above, which has a cushioning capability variable with the magnitude of an impact applied thereto.

A still further object of the present invention is to provide an improved elastically deformable fender of the type referred to above which can readily and easily be manufactured without requiring any complicated procedure and without substantially requiring the use of manufacturing equipment specially designed for the production of the fender of the present invention.

To this end, there is provided an elastically deformable fender adapted to be mounted on one or both of an impact applying element and an impact receiving element for cushioning the impact applied from the impact applying element to the impact receiving element, which generally comprises an elongated body of one-piece construction made of an elastic material and having a buffer block, an outer surface of said buffer block forming an impact receiving surface, and a pair of opposed support walls depending from said buffer block so as to diverge from each other in a direction opposite to the impact receiving surface. In accordance with the present invention, each of the support walls is bent widthwise and is constituted by a leg section adjacent the buffer block and on one side of the point at which the corresponding support wall is bent widthwise, and a heel section on the other side of the bent point. Each heel section substantially occupies a free side edge portion of the corresponding support wall which is remote from the buffer block and has a fitting flange outwardly extending therefrom in a direction substantially parallel to the plane of the impact receiving surface. The maximum inside span between the heel sections of the associated support walls is selected to be within the range of a value equal to or greater than three-fourth of the width of the buffer block, as measured in a direction perpendicular to the longitudinal axis of the fender, to a value equal to or smaller than one and one-half of the width of the same buffer block, namely, $0.75W \leq S \leq 1.5W$, wherein W and S respectively represent the width of the buffer block and the maximum inside span between the heel sections. The leg section of each of the support walls has a uniform thickness t preferably within the range of 0.2H to 0.4H, wherein H represents the overall height of the fender as measured between the impact receiving surface of the buffer block and a fitting surface plane in which respective areas of contact of the fitting flanges to the impact receiving element lies, while the heel section of the corresponding support wall may have a thickness, either uniform or varying.

In addition, by the reason as will become clear from the subsequent description, the angle of divergence of the support walls from each other in a direction opposite to the impact receiving surface of the buffer block may be so selected that the leg section of each of the support walls can form an angle within the range of 55° to 80°, preferably within the range of 65° to 75°, relative to the fitting surface plane while the heel section contiguous to such leg section has an inside face lying at an angle within the range of 75° to 90° relative to the fitting surface plane and an outside face lying at an angle within the range of 55° to 90°.

Moreover, the thickness T of the buffer block is preferably within the range of 0.1H to 0.3H and, more preferably, within the range of 0.2H to 0.25H. Yet, the height h of each of the heel sections, as measured from the fitting surface plane to the point at which the corresponding support wall is bent widthwise, is preferably within the range of 0.5H to 0.4H and, more preferably, within the range of 0.175H to 0.275H.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
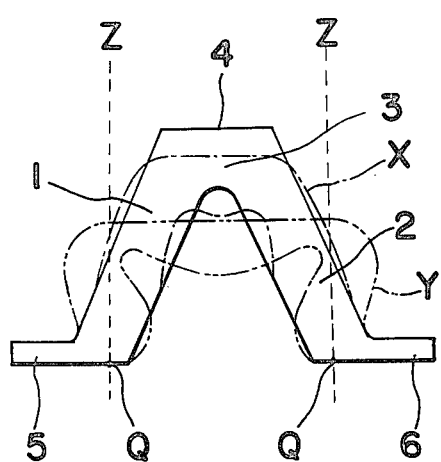
FIG. 1 is a cross sectional representation of the prior art elastically deformable fender.

Before the description of the present invention proceeds, it is to be noted that like parts are designated by like reference numerals throughout the accompanying drawings.

Figure 3:
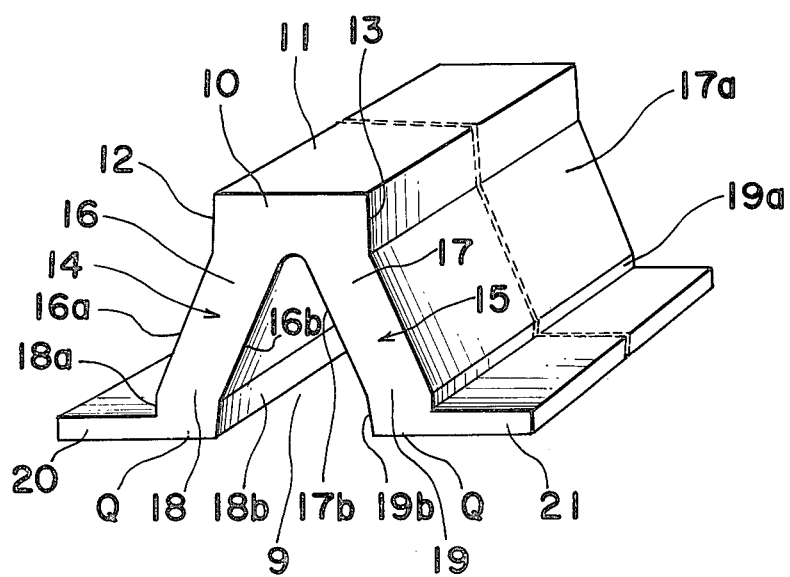
FIG. 3 is a perspective view of an elastically deformable fender constructed in accordance with the present invention.
Figure 4:
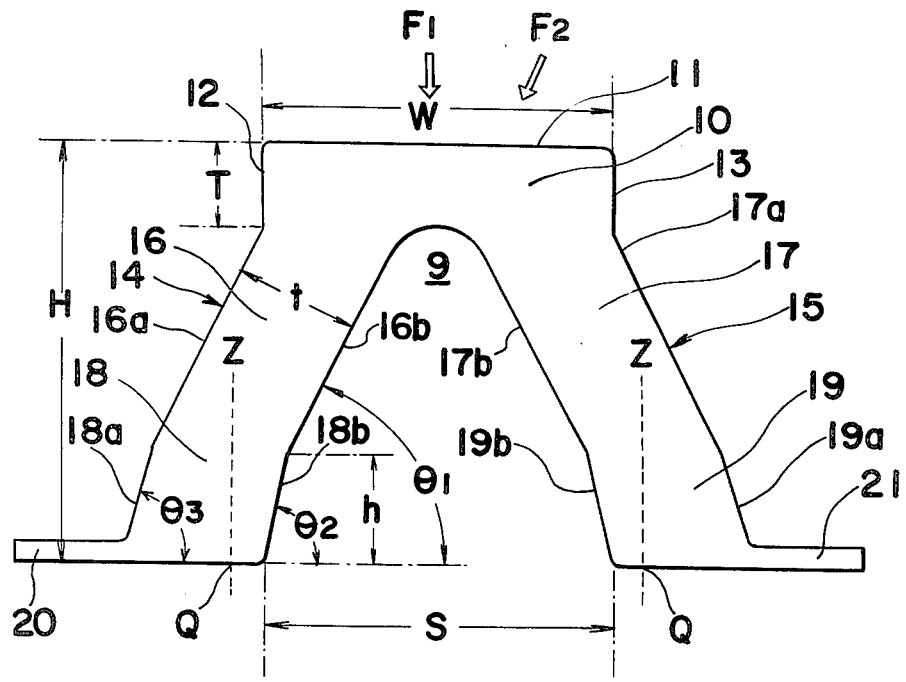
FIG. 4 is an end view of the elastically deformable fender shown in FIG. 3.

Referring first to FIGS. 3 and 4, an elastically deformable fender particularly suited for use on one or both of the hull of a ship and a shore installation such as pier, wharf, quay, dock, float or the like structure for cushioning the impact or shock energy applied from the hull of the ship to the shore installation generally comprises an elongated body of one-piece construction made of an elastic material, such as rubber, and having a cross sectional shape similar to a substantially inverted figure of "Y". The fender body includes a buffer block 10 of substantially rectangular cross section having an outer surface 11 forming an impact receiving surface and a pair of side faces 12 and 13, the plane of each of said side faces 12 and 13 lying at right angles to the plane of the impact receiving surface 11, and a pair of opposed support walls 14 and 15 depending from an inner surface of the buffer block 10 so as to diverge from each other in a direction away from the buffer block 10. The buffer block 10 and the opposed support walls 14 and 15 jointly form an elongated hollow 9 of substantially triangular cross section together with a surface of an impact receiving element (not shown) which may be either the shore installation or the hull of a ship when the fender of the present invention is mounted on such impact receiving element.

As best shown in FIG. 4, each of the support walls 14 and 15 is bent widthwise and is therefore constituted by a leg section 16 or 17, positioned adjacent the buffer block 10 and on one side of the point at which the corresponding support wall 14 or 15 is bent, and a heel section 18 or 19 positioned on the other side of the bent point. Each heel section 18 or 19 substantially occupies a free side edge portion of the corresponding support wall 14 or 15 which is remote from the buffer block 10 and has a fitting flange 20 or 21 outwardly extending therefrom in a direction opposite to the hollow 9 and in parallel relation to the plane of the impact receiving surface 11.

While the support walls 14 and 15 spread from the buffer block 10 so as to diverge from each other as hereinbefore described, the heel sections 18 and 19 of the respective support walls 14 and 15 are spaced from each other a maximum span S which satisfies the following relationship.

$$(0.75 \times W) \leq S \leq (1.5 \times W)$$

wherein W represents the width of the buffer block 10 as measured between the planes of the respective side faces 12 and 13.

In view of the fact that the buffer block 10 of the fender constructed according to the present invention has a substantial thickness T which is preferably within the range of $(0.1 \times H)$ to $(0.3 \times H)$ and, more preferably, within the range of $(0.2 \times H)$ to $(0.25 \times H)$, wherein H represents the overall height H of the fender as measured between the plane of the impact receiving surface 11 and the fitting surface plane where respective surfaces of the fitting flanges 20 and 21 adapted to contact the impact receiving element during the use of the fender lay as shown in FIG. 4, the time at which the buckling movement occurs in the support walls 14 and 15 subsequent to the application of the impact to the fender body through the impact receiving surface 11 can be delayed, thereby allowing the fender body to retain its rigidity for a substantial period of time and, also, once the support walls 14 and 15 have undergone the buckling movement by the action of the impact applied to the fender body, the time at which outer surface portions of the respective support walls 14 and 15 contact the impact applying element, for example, the hull of the ship, upon complete buckling of the support walls 14 and 15 can be delayed, thereby allowing the fender body to support a relatively large amount of deformation of the support walls 14 and 15. Where the thickness T of the buffer block 10 is smaller than the lowermost limit, there is the possibility, as is the case with the prior art fender of the construction shown in FIG. 1, that the support walls will be buckled immediately after the application of the impact or shock to the impact receiving surface with the surface area of the impact receiving surface increased to such an extent as to invite reduction of the energy absorbability of the fender itself.

On the other hand, where the thickness T of the buffer block 10 is greater than the uppermost limit, which may result in reduction of the width of each of the support walls 14 and 15 for a given height of the fender, the fender will generate a relatively excessive amount of reaction force, tending to restore to the original shape, shortly after the impact or shock has been applied thereto through the impact receiving surface 11 and, therefore, the fender will no longer be capable of supporting the relatively large amount of deformation of the support walls.

Figure 5A:
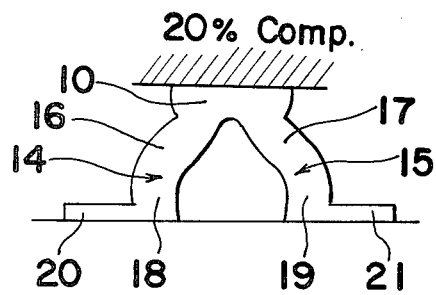
FIGS. 5a-5c are views similar to FIG. 4, showing the sequence of deformation of the fender of the present invention according to the magnitude of loads applied to the fender.
Figure 5B:
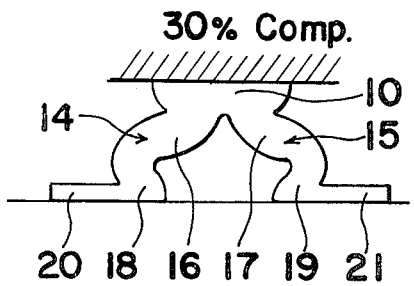
Figure 5C:
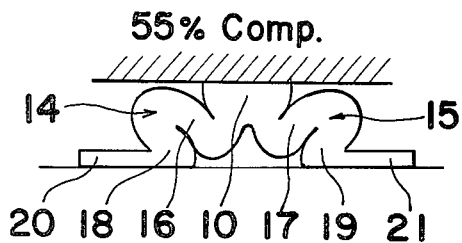

The fact that each of the support walls 14 and 15 is bent widthwise at the boundary between the corresponding leg section 16 or 17 and the heel section 18 or 19 allows the support walls 14 and 15 to buckle in such a manner as shown by (a), (b) and (c) in FIG. 5 in sequence, subsequent to compression of the buffer block 10 resulting from the application of the impact to the impact receiving surface 11. More specifically, referring to FIG. 5, assuming that the boardside of the hull of a ship approaching the shore installation contacts the impact receiving surface 11 of the fender mounted on such shore installation, the buffer block 10 is first inwardly compressed with the supporting walls 14 and 15 tending to buckle outwardly with respect to each other about the respective boundaries between the leg sections 16 and 17 and the heel sections 18 and 19 as can readily be understood from the comparison of such conditions as shown by (a) and (b) in FIG. 5. It is to be noted that the conditions respectively shown by (a) and (b) in FIG. 5 show the fender body of the present invention 20% and 30% compressed relative to the original shape, respectively. Unless otherwise each of the support walls is bent on the contrary to the teachings of the present invention, there is the possibility, as is the case with the prior art fender of the construction shown in FIG. 1, that the support walls may buckle irregularily and at different buckling points with no substantial cushioning effect continuing for a prolonged period of time.

Figure 2:
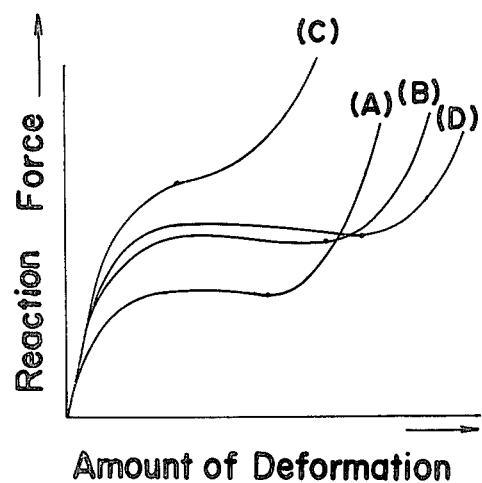
FIG. 2 is a graph showing performance curves of the various fenders including that constructed according to the present invention.

That each of the support walls 14 and 15 is bent, i.e., that each of the support walls 14 and 15 is constituted by the corresponding leg and heel sections 16 and 18 or 17 and 19 integrally connected to each other at a predetermined angle, is advantageous in not only facilitating the buckling movement of each of the side walls 14 and 15 in the manner described above subsequent to the compression of the buffer block 10, but also preventing a sudden and rapid reduction in rigidity, which may take place subsequent to the buckling movement of the support walls 14 and 15, thereby to delay the time at which the buckled support walls 14 and 15 may subsequently contact the boardside of the ship hull, such contact of the buckled support walls 14 and 15 to the boardside of the ship hull together with the impact receiving surface 11 taking place when the fender body of the present invention is compressed or collapsed, for example, approximately 55% as shown by (c) in FIG. 5. The performance curve of the fender constructed according to the present invention is shown by (D) in the graph of FIG. 2.

It is to be noted that the height h as shown in FIG. 4 and as measured from the above described fitting surface plane to the point at which each of the support walls 14 and 15 is bent, that is, the boundary between the leg and heel sections 16 and 18 or 17 and 19 of each of the support walls 14 and 15, is preferably within the range of $(0.15 \times H)$ to $(0.4 \times H)$ and, more preferably, within the range of $(0.175 \times H)$ to $(0.275 \times H)$, wherein H represents the overall height of the fender as defined hereinbefore. It is however to be noted that an outer surface 18a or 19a of each of the heel sections 18 and 19 of the respective support walls 14 and 15 may be in flush with a corresponding outer surface 16a or 17a of the associated leg section 16 or 17 as will be understood from the subsequent description. Even if the outer surfaces 18a and 19a of the associated heel sections 18 and 19 are respectively in flush with the outer surfaces 16a and 17a of the associated leg sections 16 and 17, the buckling movement of the support walls 14 and 15 can take place with no difficulty provided that the plane of an inner surface 18b or 19b of each heel section 18 or 19 be made to intersect the plane of an inner surface 16a or 17a of each leg section 16 or 17 to which said inner surface 18b or 19b is contiguous. However, if the plane of each of the outer surfaces 18a and 19a is made to intersect the plane of the associated outer surface 16a or 17a of the corresponding leg section 16 or 17 such as shown, the buckling movement of the support walls 14 and 15 can be facilitated.

The angle of divergence of the support walls 14 and 15 is so selected that the outer and inner surfaces 16a and 16b or 17a and 17b of any one of the leg sections 16 and 17 form an angle $\theta1$ within the range of 55° to 80° and, preferably, within the range of 65° to 75°, relative to the fitting surface plane while such any one of the leg sections 16 and 17 has a uniform thickness t within the range of $(0.2 \times H)$ to $(0.4 \times H)$ and that the inner and outer surfaces 18b and 18a or 19b and 19a of any one of the heel sections 18 and 19 form respective angles $\theta2$ and $\theta3$, the angle $\theta2$ being within the range of 75° to 90° relative to the fitting surface plane and the angle $\theta3$ being within the range of 55° to 90° relative to the same fitting surface plane. While the thickness of any one of the heel sections 18 and 19 may be equal to or greater than the thickness t of any one of the leg sections 16 and 17, the thickness t of each of the leg sections 16 and 17 should be selected within the above described range since it is influential on the time at which the support walls 14 and 15 start their buckling movement subsequent to the application of the impact to the impact receiving surface 11 and also the amount of deformation of the support walls 14 and 15 during the buckling movement.

In any event, for the fender of the present invention to satisfy the requirement of $(0.75 \times W) \leq S \leq (1.5 \times W)$ is essential to allow the block 10 to be located inwardly between the imaginary planes Z passing through the respective fulcrums Q at right angles to the fitting surface plane during a working period from the start of the application of the impact to the fender to the completion of the condition (c) shown in FIG. 5, that is, the time at which the buckled support walls 14 and 15 become contacting the boardside of the ship hull. This is necessary to avoid the possibility of generation of an excessive amount of reaction force which may cause the ship to move away from the shore installation so far from allowing the ship to approach the shore installation and also the boardside of the ship to be indented, and to render the fender of the present invention to absorb a relatively large amount of shock or impact energies.

It is to be noted that the lowermost limit of $(0.75 \times W)$ in the requirement of the span S relative to the width W is applicable where, in consideration of the possibility that the impact is applied to the impact receiving surface 11 in a direction diagonal with respect to the plane of said surface 11 as shown by the arrow F2 in FIG. 4, a heel member (not shown) is formed in each heel section 18 or 19 so as to extend in a direction opposite to the direction of extension of the corresponding fitting flange 20 or 21. If no respective heel member is provided in the heel sections 18 and 19 such as in the illustrated embodiment, this lowermost limit should be $(1.0 \times W)$, that is, equal to the width W of the buffer block 10.

Although the present invention has fully been described in connection with the preferred embodiment thereof, it should be noted that various changes and modifications are apparent to those skilled in the art. By way of example, a rigid reinforcement plate, for example, a metallic plate, may be embedded in each of the fitting flanges 20 and 21 so as to extend into the corresponding heel section 18 or 19, so that the fender of the present invention can rigidly be secured to the impact receiving element.

In addition, the impact receiving surface 11 of the buffer block 10 may be coated with a layer of such a material as having a high wear-resistance and a low coefficient of friction. Examples of this wear-resistant and lubricating material are nylon and tetrafluoroethylene.

Accordingly, such changes and modifications are to be understood as included within the true scope of the present invention unless they depart therefrom.

We claim:

1. An elastically deformable fender adapted to be mounted on one or both of an impact applying element and an impact receiving element for cushioning the impact applied from the impact applying element to the impact receiving element, said fender comprising an elongated body of one-piece construction having a buffer block of substantially rectangular cross section, said buffer block having a thickness within the range of $(0.1 \times H)$ to $(0.3 \times H)$, wherein H represents the overall height of the fender, an outer surface of said buffer block forming an impact receiving surface, and a pair of opposed support walls extending from said buffer block so as to diverge from each other in a direction away from said buffer block, at least the inner surface of said support walls being bent at their free side edge portions inwardly with respect to each other thereby providing respective leg sections adjacent the buffer block, each of the leg sections having a thickness within the range of $(0.2 \times H)$ to $(0.4 \times H)$, with H representing the overall height of the fender, and respective heel sections on one side of said leg sections remote from the buffer block, each of said heel sections having a fitting flange protruding outwardly from the corresponding heel section in parallel relation to the plane of said impact receiving surface, said heel sections being spaced from each other a maximum span S within the range of $(0.75 \times W)$ to $(1.5 \times W)$, wherein W represents the width of said buffer block, said heel section being measured from the boundary between the corresponding heel and leg sections to a plane which is in flush with fitting surfaces of the respective fitting flanges adapted to contact the impact receiving element and is within the range of $(0.15 \times H)$ to $(0.4 \times H)$, with H representing the overall height of the fender, and wherein the angle of divergence of the support walls is so selected that a plane of any one of the inner and outer surfaces of each of the leg sections, which are opposed to each other across the thickness of the leg section, forms an angle within the range of 55° to 80° relative to the plane which is in flush with fitting surfaces of the respective fitting flanges adapted to contact the impact receiving element, that a plane of any one of inner surfaces of the respective heel sections, which face towards each other, forms an angle within the range of 75° to 90° relative to said plane in flush with the fitting surfaces of the respective fitting flanges while a plane of any one of outer surfaces of the respective heel sections, which are opposite to said inner surfaces of said heel sections, forms an angle within the range of 55° to 90° relative to said plane in flush with the fitting surfaces of the respective fitting flanges.

2. An elastically deformable fender adapted to be mounted on one or both of an impact applying element and an impact receiving element for cushioning the impact applied from the impact applying element to the impact receiving element, said fender comprising an elongated body of one-piece construction having a buffer block of substantially rectangular cross section, an outer surface of said buffer block forming an impact receiving surface, and a pair of opposed support walls extending from said buffer block so as to diverge from each other in a direction away from said buffer block, at least the inner surface of said support walls being bent at their free side edge portions inwardly with respect to each other thereby providing respective leg sections adjacent the buffer block, each of the leg sections having a thickness within the range of $(0.2 \times H)$ to $(0.4 \times H)$, with H representing the overall height of the fender, and respective heel sections on one side of said leg sections remote from the buffer block, each of said heel sections having a fitting flange protruding outwardly from the corresponding heel section in parallel relation to the plane of said impact receiving surface, said heel sections being spaced from each other a maximum span S within the range of $(0.75 \times W)$ to $(1.5 \times W)$, wherein W represents the width of said buffer block, said heel section being measured from the boundary between the corresponding heel and leg sections to a plane which is in flush with fitting surfaces of the respective fitting flanges adapted to contact the impact receiving element and is within the range of $(0.15 \times H)$ to $(0.4 \times H)$, with H representing the overall height of the fender, and wherein the angle of divergence of the support walls is so selected that a plane of any one of the inner and outer surfaces of each of the leg sections, which are opposed to each other across the thickness of the leg section, forms an angle within the range of 55° to 80° relative to the plane which is in flush with fitting surfaces of the respective fitting flanges adapted to contact the impact receiving element, that a plane of any one of inner surfaces of the respective heel sections, which face towards each other, forms an angle within the range of 75° to 90° relative to said plane in flush with the fitting surfaces of the respective fitting flanges while a plane of any one of outer surfaces of the respective heel sections, which are opposite to said inner surfaces of said heel sections, forms an angle within the range of 55° to 90° relative to said plane in flush with the fitting surfaces of the respective fitting flanges.

3. The fender of claims 1 or 2, which is made of an elastic material.

* * * * *